No. 788,303. PATENTED APR. 25, 1905.
N. A. CHRISTENSEN.
METALLIC PISTON PACKING.
APPLICATION FILED FEB. 27, 1901.
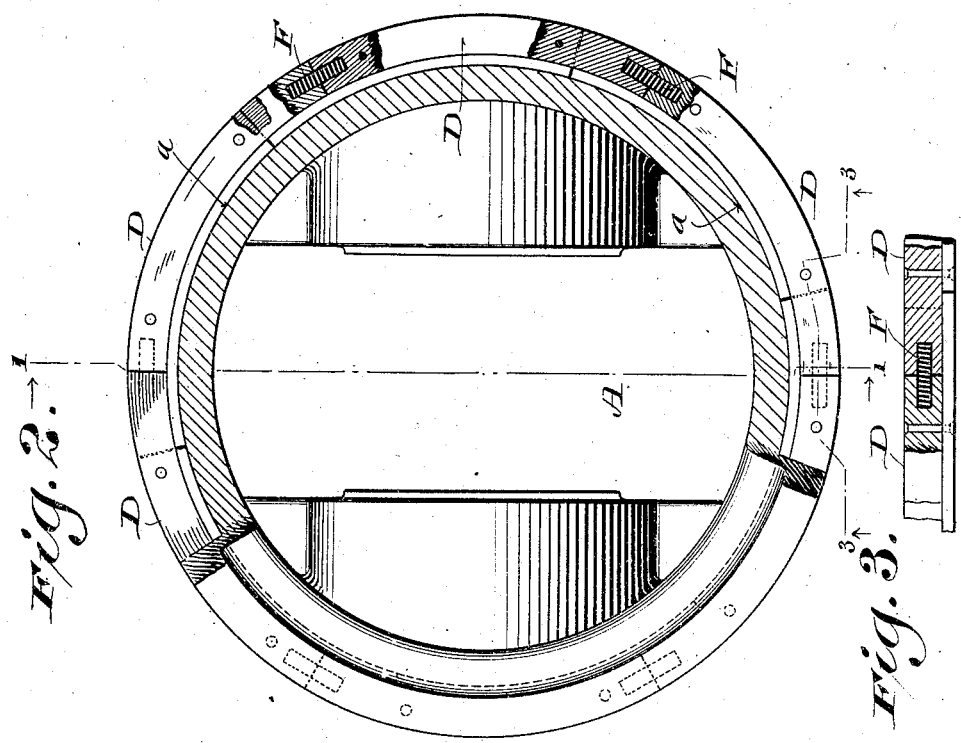
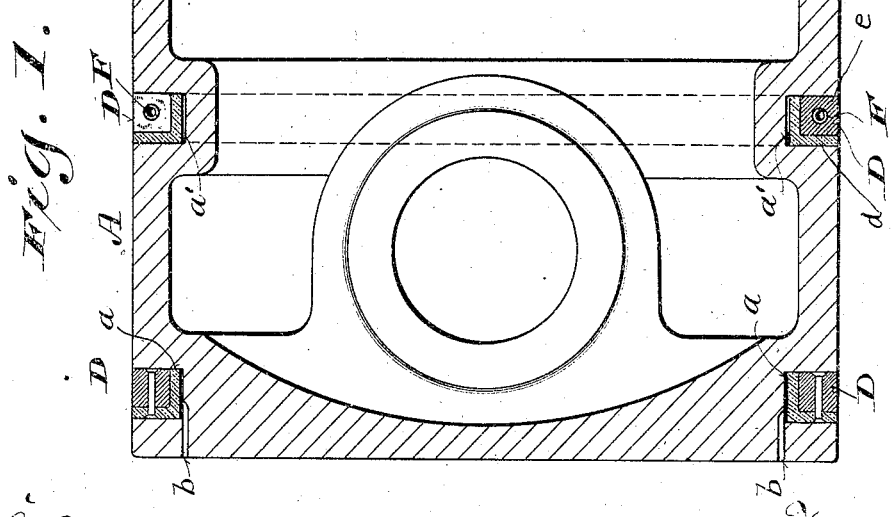
Witnesses:
Geo. W. Young.
Chas. L. Goos.
Inventor:
Niels A. Christensen
By Winkler, Flanders, Smith, Bottum & Vilas,
Attorneys.

No. 788,303.                                              Patented April 25, 1905.

UNITED STATES PATENT OFFICE.

NIELS ANTON CHRISTENSEN, OF MILWAUKEE, WISCONSIN.

METALLIC PISTON-PACKING.

SPECIFICATION forming part of Letters Patent No. 788,303, dated April 25, 1905.

Application filed February 27, 1901. Serial No. 49,070.

*To all whom it may concern:*

Be it known that I, NIELS ANTON CHRISTENSEN, a subject of the King of Denmark, residing at Milwaukee, in the county of Milwaukee and State of Wisconsin, have invented certain new and useful Improvements in Metallic Piston-Packing, of which the following is a specification, reference being had to the accompanying drawings, forming a part thereof.

The main object of my invention is to provide oil and air tight metallic packing that will be effective and durable and require little or no care to keep it in repair and working order.

It consists in certain novel features in construction and in the arrangement and combinations of parts hereinafter particularly described, and pointed out in the claims.

In the accompanying drawings like letters designate the same parts in the several figures.

Figure 1 is a central longitudinal section on the line 1 1, Fig. 2, of a trunk-piston provided with my improved packing. Fig. 2 is a view, partly in end elevation and partly in cross-section, through one of the packing-grooves as viewed from the right with reference to Fig. 1; and Fig. 3 is a section on the broken line 3 3, Fig. 2, showing the lapped slip-joint between the ends of two contiguous sections.

For the purpose of illustration I have shown my improved packing as applied to a trunk-piston which is particularly designed for compressors; but it is applicable to other kinds of pistons.

Referring to the drawings, A designates a piston, which is formed with circumferential grooves $a\ a'$, the bottom of one of which communicates through passages or openings $b\ b$ with the working end of the cylinder. In the grooves $a\ a'$ are fitted the metallic packing-rings consisting of segmental sections D D, each of which is composed of square and L-shaped parts $d$ and $e$, riveted or otherwise secured together, with the end of one part projecting beyond the end of the other part, so as to break joints with the ends of the adjoining sections and form therewith lapped slip-joints, whereby the sections may be spread endwise and the packing-rings expanded, so as to form tight joints with the inner surface of the cylinder. The ends of the square parts $d$ are formed with longitudinal sockets, in which are inserted spiral springs F, tending to spread the sections and expand the packing-rings. These springs are inclosed and protected by the parts in which they are inserted, and the packing-rings are made to fill or very nearly fill the grooves $a\ a'$ in the piston, thus reducing the clearance-space to a minimum.

During the period of compression the pressure admitted through the passages or openings $b$ into the bottom of the groove $a$ forces the packing-ring therein outward against the inner surface of the cylinder, thereby producing and maintaining a close fit and fluid-tight joint between said ring and cylinder.

During the period of intake or suction the springs F overcome the tendency of the vacuum or partial vacuum produced in the packing-groove $a$ to contract said packing-ring, which is thus held outward against the inner surface of the cylinder with sufficient force to prevent leakage past the piston from one end of the cylinder into the other.

It is obvious that a piston may be provided with one or more packing-rings, and in case of a double-acting piston one of the packing-grooves may communicate with one end of the cylinder while another communicates with the other end of the cylinder, so that one of the rings will be pressed outwardly during each single stroke of the piston.

Heretofore it has been customary with metallic packing to spread the sections or expand the rings in the cylinder by means of bowed leaf-springs interposed between the bottoms of the grooves and the packing-rings. Such springs are usually held in place by inwardly-projecting lugs formed on the packing-rings. The constant rubbing and wear of the ends and bows of such springs against the packing-rings and the bottoms of the grooves in the piston ultimately weaken the springs to such an extent that they become useless for the purpose intended and have to be replaced. With this construction and arrangement considerable space is required for the springs between the bottoms of the grooves and the inner faces of the rings, and to this extent the clearance-space is increased. This is particularly objectionable in compressors in which it is desirable to reduce the clearance-space as much as possible. These objections are avoided by my improved construction hereinbefore described.

Various changes in the minor details of construction and in the arrangement of parts may be made within the spirit and intended scope of the invention.

I claim—

1. Metallic piston-packing, consisting of a number of segmental sections adapted to overlap and slip endwise upon each other at their ends, the several sections formed with sockets in their ends, and springs inserted in said sockets and tending to separate the several sections and to expand the packing, substantially as described.

2. Metallic piston-packing, consisting of segmental sections each composed of square and L-shaped parts secured together so as to project one by the other at each end and break joints with adjoining sections, the ends of the square parts of the several sections being formed with sockets, and springs inserted in said sockets and tending to spread the sections, substantially as described.

3. The combination with a piston formed with a circumferential packing-groove and openings leading from one end of the piston into the bottom of said groove, of a packing-ring fitted in said groove and consisting of segmental sections, each of which is composed of square and L-shaped parts secured together so as to project one by the other at each end and break joints with adjoining sections, the ends of the sections being formed with sockets, and springs inserted in said sockets and tending to spread the sections and expand the packing-ring in the cylinder, substantially as described.

In witness whereof I hereto affix my signature in presence of two witnesses.

NIELS ANTON CHRISTENSEN.

Witnesses:
 CHAS. L. GOSS,
 ALICE E. GOSS.